July 1, 1930.  E. H. FREEMAN  1,768,552
ELECTRIC METER
Filed Dec. 31, 1925
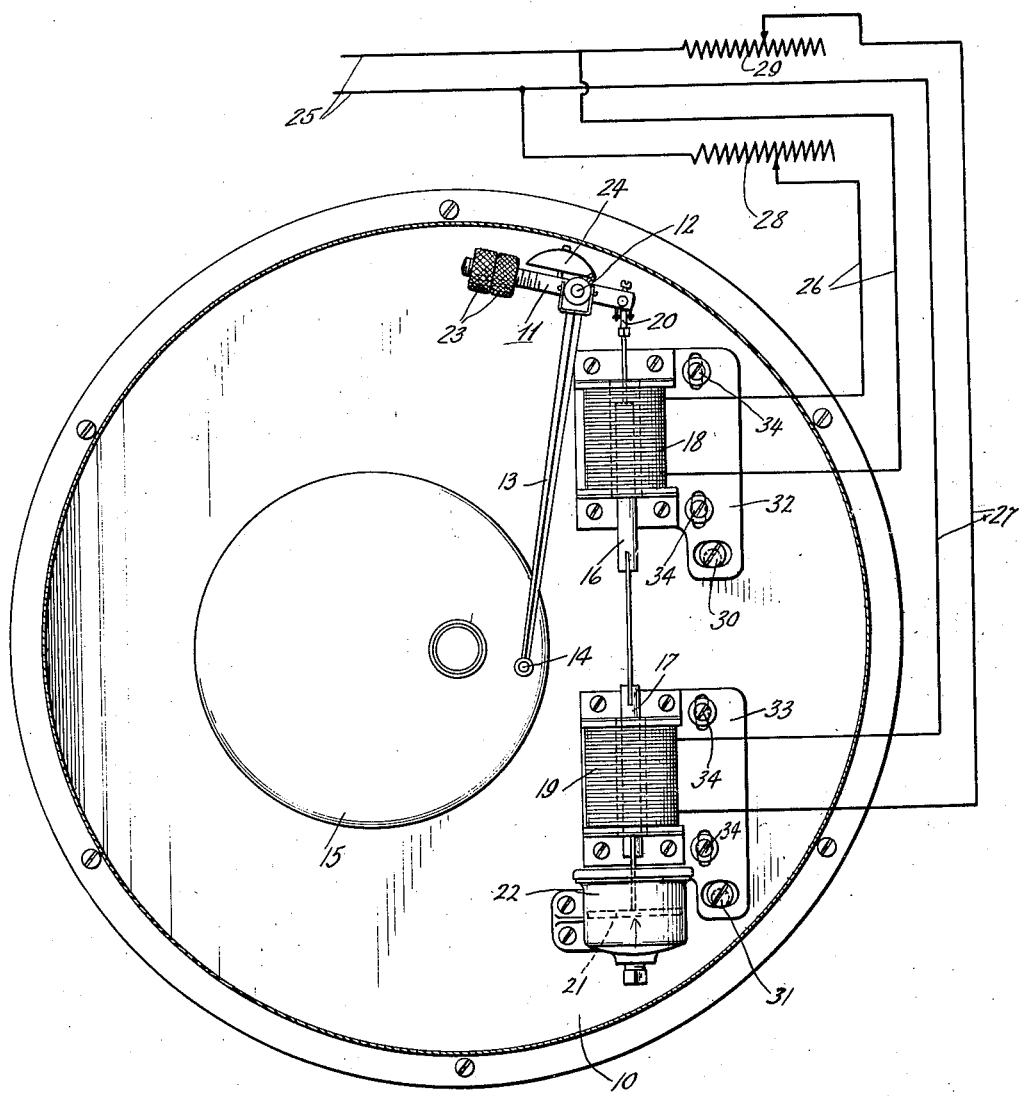

Patented July 1, 1930

1,768,552

UNITED STATES PATENT OFFICE

ERNEST H. FREEMAN, OF WILMETTE, ILLINOIS, ASSIGNOR TO REPUBLIC FLOW METERS CO., OF CHICAGO, ILLINOIS, A CORPORATION OF ILLINOIS

ELECTRIC METER

Application filed December 31, 1925. Serial No. 78,504.

This invention relates to meters for indicating or recording variations in resistance or other function of an electric circuit and has for its object the provision of such a meter which shall be of improved construction and operation and in which the readings will be independent of changes in voltage.

The invention is exemplified in the combination and arrangement of parts shown in the accompanying drawing and described in the following specification and it is more particularly pointed out in the appended claims.

In the drawing the figure is a somewhat diagrammatic elevation of an electrical instrument embodying one form of the present invention.

In connection with the measurement of a variety of quantities, instruments have been devised to vary the resistance or other characteristic of an electric circuit as a function of the quantity to be measured. An example of an instrument of this kind is the flow meter shown in Patent #1,325,763 to J. M. Spitzglass. In a circuit including an instrument of this kind, the current is inversely proportional to the resistance if the impressed voltage remains constant. It is, however, difficult to secure a source of electro-motive force which can be relied upon to remain constant and for this reason an instrument is desirable in which the reading will be controlled by variations in the circuit independently of changes in the impressed electro-motive force. The present invention provides an instrument of this nature.

In the drawing, the numeral 10 designates an instrument case having a beam 11 pivotally mounted at 12 therein. The beam 11 carries a needle 13 having a tracer or pen point 14. The pen point 14, in the form of the instrument illustrated, is arranged to travel on a rotating chart, not shown, a clock 15 being provided for driving the chart in a manner well-known in the art. The beam 11 supports a pair of core members 16 and 17, preferably made of laminated electric steel. These core members are freely movable within solenoids 18 and 19, respectively, and are supported by means of a universal joint 20 from one end of the beam 11. Connected with the lower end of the lowermost core member 17 is a piston 21 arranged to move in a dash pot 22. The system, including the core members, the piston 21, the needle 13, and the beam 11, is balanced by adjustable weights 23 and 24, so that the action of gravity does not affect the movement of the system about its pivotal axis 12 within the normal range of movement thereof. The solenoids 18 and 19 are supplied from a common source of electro-motive force 25. The solenoids 18 and 19 are connected with the supply 25 by means of parallel circuits 26 and 27, respectively. A variable resistance 28 is arranged in the circuit 26 and may be controlled by any suitable mechanism such as the flow meter referred to above, the resistance being varied as a function of the quantity to be measured. The circuit 27 may be provided with an adjustable resistance 29 for adjusting the reading of the instrument as will be hereinafter explained. The solenoids 18 and 19 are preferably mounted for adjustment in the direction of the axis of the core members. Eccentric screws 30 and 31 may be provided for this purpose, the solenoids being supported on brackets 32 and 33 having slots therein engaged by screws 34.

To explain the operation of the device, the action of each solenoid and its corresponding core will first be considered separately, having in mind the fact that the system supported on the pivot 12 is balanced against the action of gravity by proper placing and proportioning the balance weights 23 and 24. Each core, if operated independently, would adjust itself to float in the center of the corresponding solenoid as soon as current is passed through the solenoid. Accordingly, if the core is made longer than the solenoid, it will project equally at each end of the solenoid, if controlled by the current in that solenoid alone. The use of a fixed coil and a moving piece of soft iron as applied in the "moving iron" type of ammeter in which a spring or gravity is made to counteract the force acting on the core is well known in the art. In such instruments, however, the position of the core with relation to the solenoid indicates the strength of the current passing through the solenoid which will, of course, vary not only inversely as the resistance in the circuit but also directly as the electro-motive force. The present invention differs from such such prior instruments, however, in the use of two cores and two solenoids connected in parallel branches of the electric circuit, the one solenoid and core producing a deflecting force and the other solenoid and core giving the counter a restoring force. Since both forces are equally affected by changes in the voltage the indications of the instrument will be independent of voltage changes.

This relation may be further explained in connection with the drawing. If, for instance, the resistance 28 be made infinite, that is, if the circuit through the solenoid 18 is opened, the current in the solenoid 19 will cause the core 17 to take a symmetrical position within the solenoid. This position, with respect to the solenoid, is independent of the voltage applied to the circuit and of the current strength, for the reason that the whole moving system is balanced against the action of gravity and there is no spring control. This position may be called the zero position of the core and by moving the solenoid up or down, by means of the eccentric 31, the pen or pointer 14 may be set at the zero position of the instrument scale while current flows in the solenoid 19 only.

The core 16 of the solenoid 18 extends much more below the solenoid than above it. Hence, when the circuit, through the solenoid 18, is closed, the current exerts an upward force on the core 16 causing it to move until this force is balanced by the downward pull of the solenoid 19 on the core 17. The position of equilibrium and therefore the deflection of the pointer or pen is a function of resistance 28 and is independent of the impressed voltage. The strength of the current in the solenoid 19 and, hence, the resistance to the movement of the needle by the solenoid 18 may be adjusted by changing the variable resistance 29. The deflection of the needle can therefore be adjusted by adjusting the resistance 29 and also by moving the solenoid 18 with respect to the core 16.

I claim:

1. An electrical measuring instrument including a support, a pair of solenoids, means mounting said solenoids on said support in alignment including means for adjusting each of said mounting means axially with respect to the other, a core for each solenoid, means connecting said cores for unitary movement and being of such length that when one core is symmetrically located with respect to its solenoid the other is unsymmetrically located in its solenoid, a pivot on said support located to one side of the axis of said solenoids and beyond the end of one of the latter, a lever pivoted on said pivot extending generally in a direction at right angles to said axis, an adjustable balance weight on one end of said lever and means for pivotally connecting the connected cores to its other end, an indicator arm connected to said lever and extending in the general direction of the axis of the solenoid and having an indicator member at its free end, and adjustable means extending from the opposite side of said lever for counterbalancing the indicator element.

2. An electrical measuring instrument including a support, a pair of solenoids, means mounting said solenoids on said support in alignment including means for adjusting each of said mounting means axially with respect to the other, a core for each solenoid, means connecting said cores for unitary movement and being of such length that when one core is symmetrically located with respect to its solenoid the other is unsymmetrically located in its solenoid, a pivot on said support located to one side of the axis of said solenoids, a lever pivoted on said support extending generally in a direction at right angles to said axis, an adjustable balance means for one end of said lever and means for pivotally connecting the connected cores to its other end, an index arm connected to said lever and having an index member at its free end, said adjustable means acting on said lever for counterbalancing the connected cores and index member.

3. An electrical measuring instrument including a support, a pair of substantially aligned solenoids, means mounting said solenoids on said support for adjusting one solenoid with respect to the other, a core for each solenoid, means connecting said cores for unitary movement and so that when one core is symmetrically located with respect to its solenoid, the other core is unsymmetrically located with respect to the other solenoid, a lever pivoted on said support to one side of the axis of said solenoids and extending generally in a direction at right angles to said axis, a balance means for said lever on one side of its axis, said cores being connected to the lever on the other side of its axis, and index means operable by the lever, the adjustable mounting means and balance means coacting with the lever for counterbalancing the cores and index means.

In testimony whereof I have signed my name to this specification on this 29th day of December, A. D. 1925.

ERNEST H. FREEMAN.